(12) United States Patent
Chi et al.

(10) Patent No.: US 12,409,509 B2
(45) Date of Patent: Sep. 9, 2025

(54) ULTRASONIC WELDING APPARATUS INCLUDING ROTATABLE ANVIL AND WELDING METHOD USING THE SAME

(71) Applicant: LG Energy Solution, Ltd., Seoul (KR)

(72) Inventors: Ho June Chi, Daejeon (KR); Hang June Choi, Daejeon (KR); Jeong Oh Moon, Daejeon (KR); Jin Yong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 214 days.

(21) Appl. No.: 17/923,699

(22) PCT Filed: Oct. 15, 2021

(86) PCT No.: PCT/KR2021/014297
§ 371 (c)(1),
(2) Date: Nov. 7, 2022

(87) PCT Pub. No.: WO2022/086061
PCT Pub. Date: Apr. 28, 2022

(65) Prior Publication Data
US 2023/0166349 A1    Jun. 1, 2023

(30) Foreign Application Priority Data

Oct. 22, 2020    (KR) .................. 10-2020-0137617

(51) Int. Cl.
*B23K 20/00* (2006.01)
*B23K 20/10* (2006.01)
*B23K 101/36* (2006.01)

(52) U.S. Cl.
CPC ........ *B23K 20/106* (2013.01); *B23K 2101/36* (2018.08)

(58) Field of Classification Search
CPC .. B29C 65/086; B23K 20/10; B23K 37/0408; B23K 20/103; B23K 20/126; B23K 37/0452; B23K 37/04; B23K 20/125
See application file for complete search history.

(56) References Cited

U.S. PATENT DOCUMENTS 4,491,306 A * 1/1985 Eickhorst ............ F16C 11/0652
                                                                269/21
5,395,098 A * 3/1995 Eickhorst ............ F16C 11/0604
                                                                269/21
(Continued)

FOREIGN PATENT DOCUMENTS

CN      101001742 A    7/2007
CN      207668689 U    7/2018
(Continued)

OTHER PUBLICATIONS

Cambridge Dictionary (https://dictionary.cambridge.org/dictionary/english/fixed) "fixed" (Year: 2025).*
(Continued)

*Primary Examiner* — Erin B Saad
(74) *Attorney, Agent, or Firm* — Lerner David LLP

(57)    ABSTRACT

The present invention relates to an ultrasonic welding apparatus including a horn unit including a horn wherein the horn is configured to contact a target to be welded and a vibrator configured to apply vibration to the horn; an anvil unit including an anvil having a first flat surface on which the target to be welded is configured to be placed and a support portion configured to support the anvil in a rotatable state; and a welding main body configured to have the horn unit and the anvil unit fixed thereto, wherein the anvil is rotated in a state of being supported by the support portion such that the first flat surface of the anvil is parallel to a welding surface of the horn, whereby parallelism between the horn (Continued)

and the anvil may be easily achieved, and welding quality may be improved.

10 Claims, 9 Drawing Sheets

(56) References Cited

U.S. PATENT DOCUMENTS

| | | | | |
|---|---|---|---|---|
| 5,639,160 | A * | 6/1997 | Kishimoto | B01F 31/26 366/208 |
| 6,012,711 | A * | 1/2000 | Cipolla | B25B 1/22 269/258 |
| 6,019,154 | A * | 2/2000 | Ma | B29C 66/8163 156/581 |
| 6,099,670 | A * | 8/2000 | Louks | B29C 66/7392 156/580.2 |
| 6,454,333 | B2 * | 9/2002 | Portal | B25B 11/007 269/21 |
| 7,179,343 | B2 * | 2/2007 | VanEperen | A61F 13/15593 156/496 |
| 7,337,938 | B2 * | 3/2008 | Noro | B29C 66/1122 228/1.1 |
| 7,452,320 | B2 * | 11/2008 | Csida | A61F 13/565 493/405 |
| 7,887,656 | B2 * | 2/2011 | Yamamoto | B29C 66/81427 156/64 |
| 7,891,111 | B2 * | 2/2011 | Mauro | G01B 5/24 33/569 |
| 8,776,856 | B2 * | 7/2014 | Yamamoto | B29C 66/0062 156/580.2 |
| 8,925,607 | B2 * | 1/2015 | Yamamoto | B29C 65/086 156/580.2 |
| 9,459,083 | B2 * | 10/2016 | Hester | G01B 5/0004 |
| 9,833,946 | B2 * | 12/2017 | Gnad | B06B 3/00 |
| 10,688,606 | B2 * | 6/2020 | Endrullat | B23K 37/0408 |
| 11,219,556 | B2 * | 1/2022 | Meisner | B29C 65/086 |
| 11,878,361 | B2 * | 1/2024 | Sakurai | B23K 20/10 |
| 12,138,897 | B2 * | 11/2024 | Fujita | B29C 66/73921 |
| 2002/0062902 | A1 * | 5/2002 | Couillard | B29C 66/7392 156/580.2 |
| 2002/0148131 | A1 * | 10/2002 | Mauro | F16C 19/502 33/569 |
| 2003/0062665 | A1 * | 4/2003 | Urlaub | B29C 65/08 269/309 |
| 2004/0226645 | A1 * | 11/2004 | Owen | B29C 66/81611 156/580.2 |
| 2005/0145317 | A1 * | 7/2005 | Yamamoto | A61F 13/15739 156/290 |
| 2007/0251643 | A1 * | 11/2007 | Umebayashi | B29C 66/81431 156/350 |
| 2007/0251977 | A1 * | 11/2007 | Gnad | B23K 20/10 228/1.1 |
| 2008/0023529 | A1 * | 1/2008 | Reatherford | B23K 20/10 228/110.1 |
| 2009/0025853 | A1 | 1/2009 | Abate | |
| 2010/0243172 | A1 * | 9/2010 | Blanchard | B29C 66/43 156/504 |
| 2012/0168084 | A1 * | 7/2012 | Yamamoto | B29C 66/8284 156/379.8 |
| 2012/0175064 | A1 * | 7/2012 | Yamamoto | B29C 66/81427 156/379.6 |
| 2013/0112736 | A1 * | 5/2013 | Kato | B23K 37/0408 228/2.1 |
| 2014/0190638 | A1 * | 7/2014 | Hull | B29C 66/244 156/580.2 |
| 2014/0260088 | A1 * | 9/2014 | Brolli | B29C 66/81427 53/375.8 |
| 2015/0158247 | A1 * | 6/2015 | Heeg | B29C 66/961 156/73.1 |
| 2015/0290873 | A1 * | 10/2015 | Hull | B29C 66/43 156/580.2 |
| 2016/0195381 | A1 * | 7/2016 | Hester | G01B 5/24 33/569 |
| 2017/0120373 | A1 * | 5/2017 | Edwards | B23K 20/1255 |
| 2017/0197741 | A1 * | 7/2017 | Carvin | B65B 3/04 |
| 2018/0221998 | A1 * | 8/2018 | Endrullat | B23Q 1/545 |
| 2019/0375166 | A1 * | 12/2019 | De Cuyper | B29C 65/08 |
| 2021/0086290 | A1 * | 3/2021 | Wang | B23K 20/106 |
| 2021/0129453 | A1 * | 5/2021 | Wang | B29C 66/95 |

FOREIGN PATENT DOCUMENTS

| | | | |
|---|---|---|---|
| CN | 111014941 A | 4/2020 | |
| DE | 19917133 A1 * | 11/2000 | ......... B23K 20/1215 |
| JP | 2013031869 A | 2/2013 | |
| JP | 2016225958 A | 12/2016 | |
| JP | 2018167274 A | 11/2018 | |
| KR | 19930002111 B1 | 3/1993 | |
| KR | 20150089497 A | 8/2015 | |
| KR | 101773644 B1 | 8/2017 | |
| KR | 20170105367 A | 9/2017 | |
| KR | 102072853 B1 | 2/2020 | |

OTHER PUBLICATIONS

Extended European Search Report including Written Opinion for Application No. 21883132.9 dated Aug. 17, 2023, pp. 1-10.
International Search Report for Application No. PCT/KR2021/014297 mailed Jan. 25, 2022, pp. 1-3.

* cited by examiner

[FIG. 1]
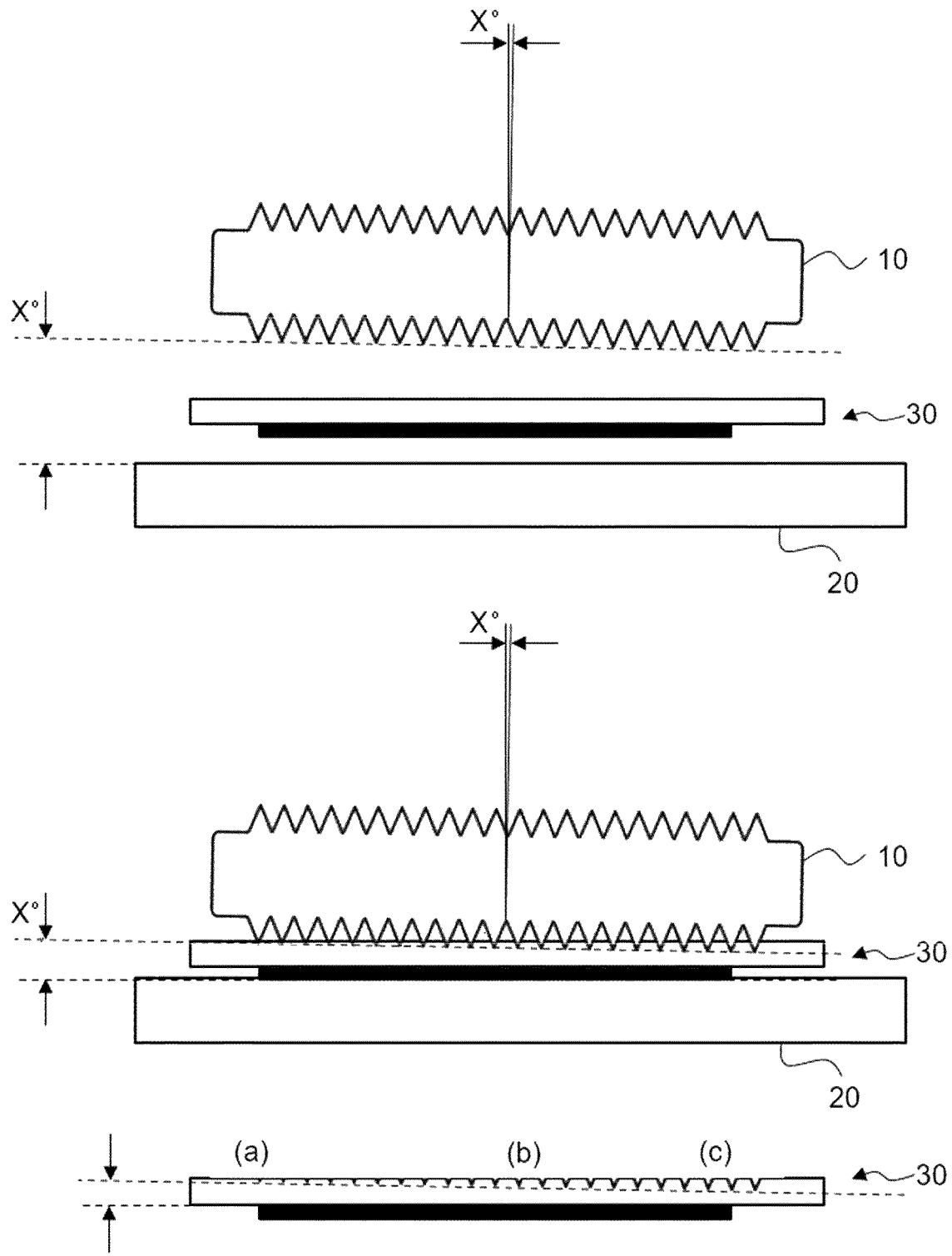

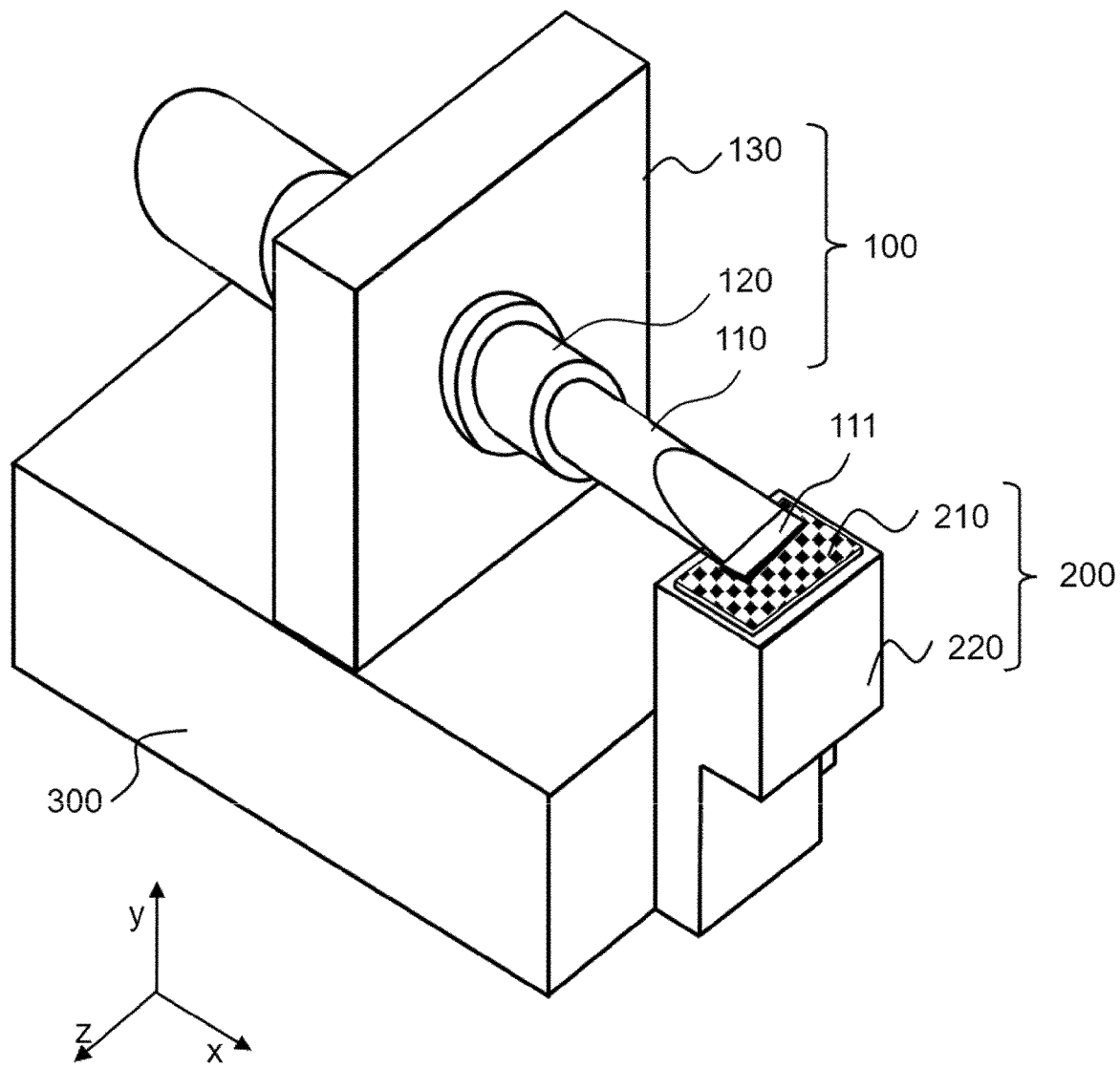
[FIG. 2]

[FIG. 3]
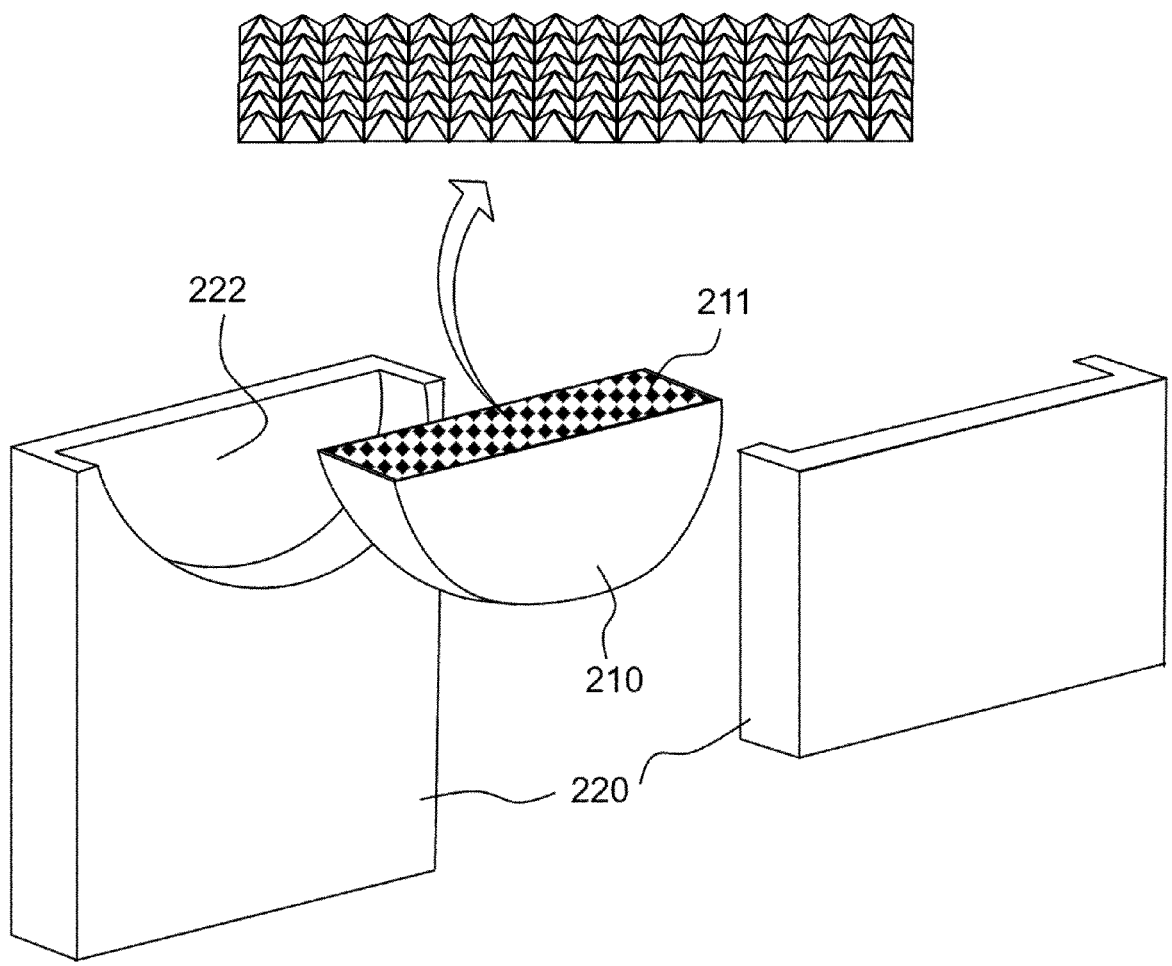

[FIG. 4]
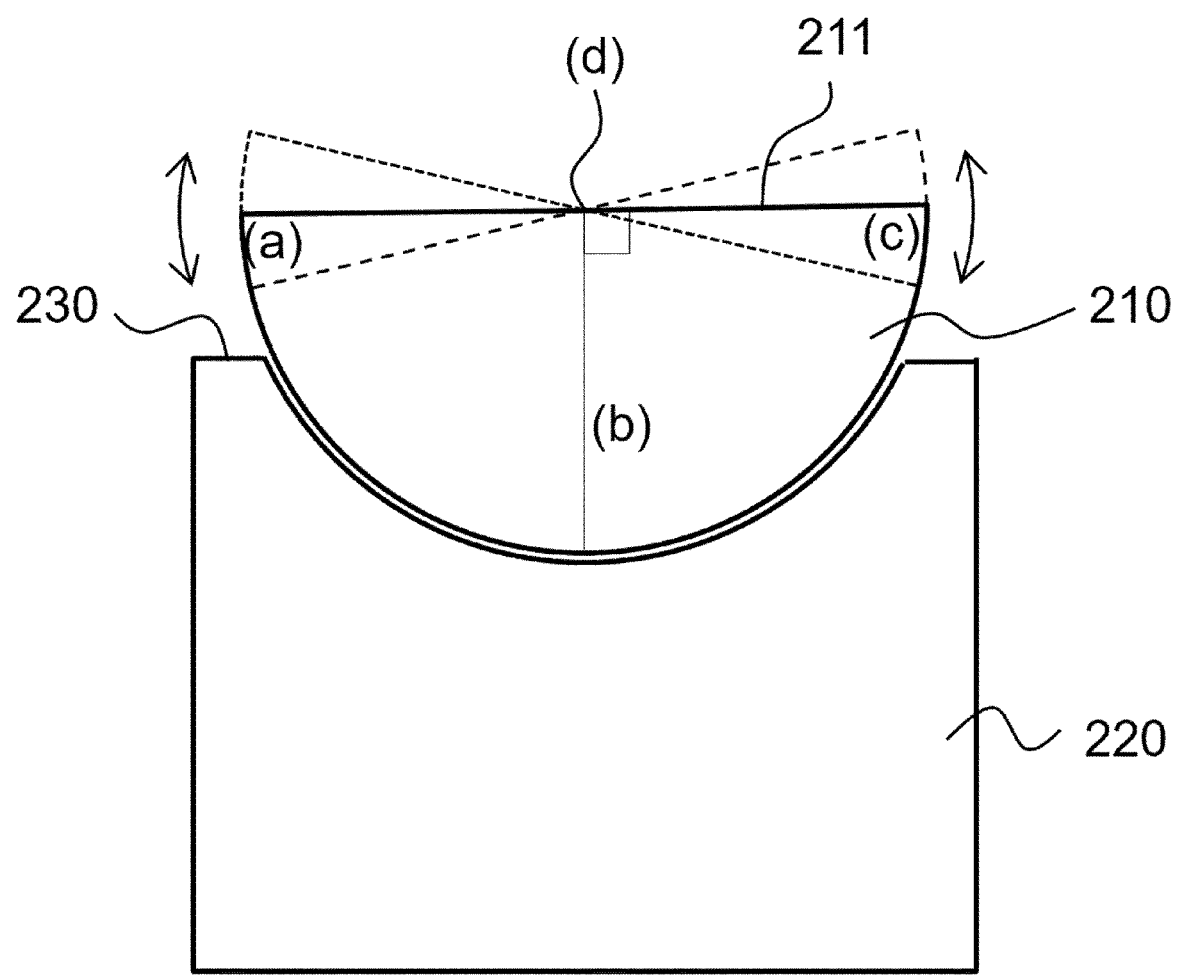

[FIG. 5]
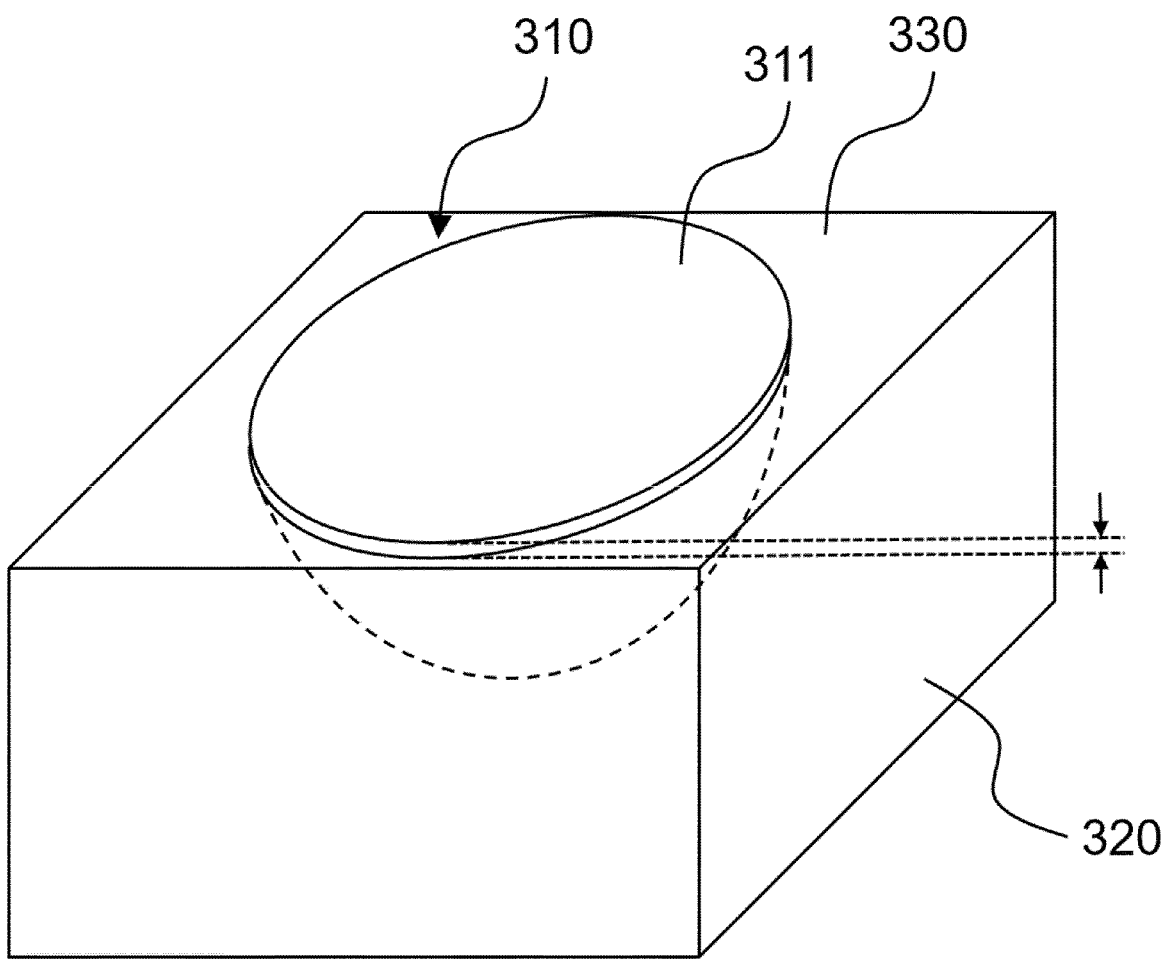

[FIG. 6]
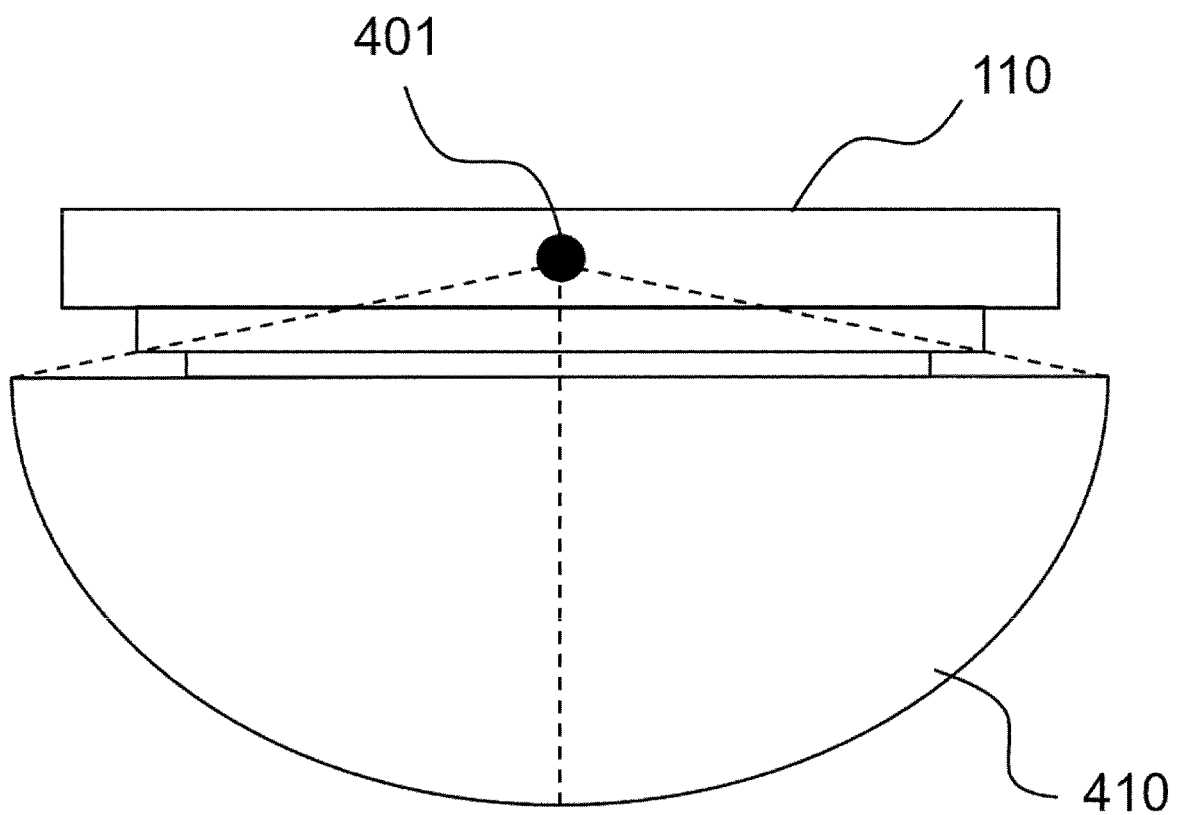

[FIG. 7]
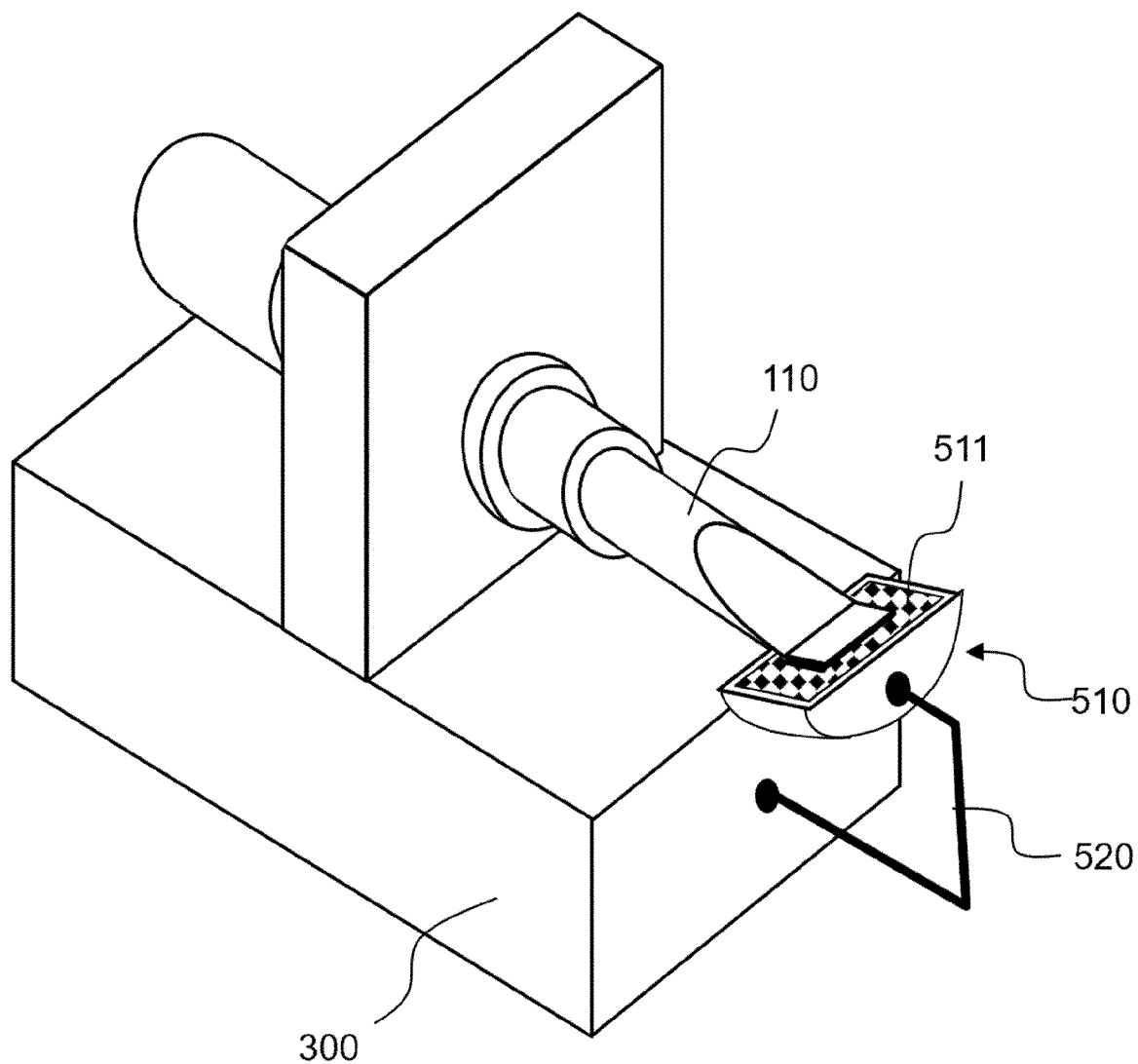

[FIG. 8]
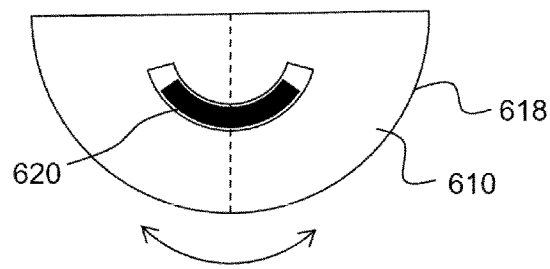
(a)
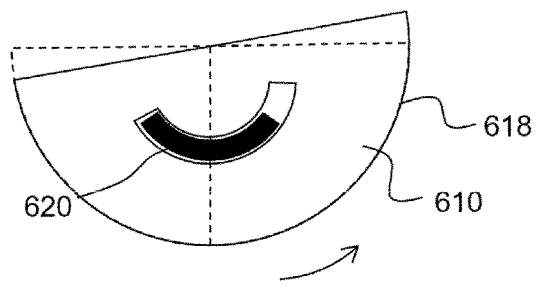
(b)
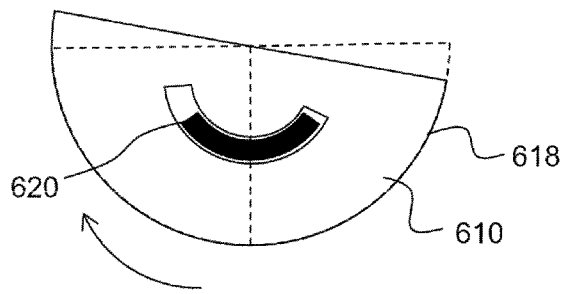
(c)

[FIG. 9]
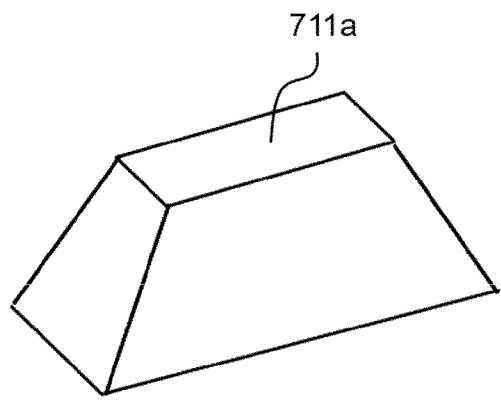
(a)
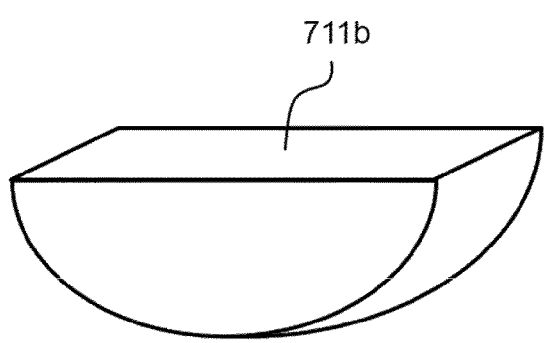
(b)
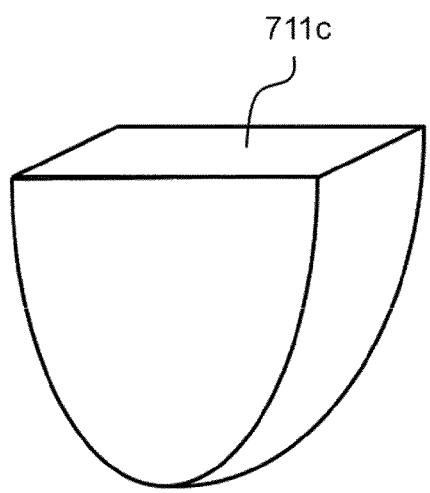
(c)
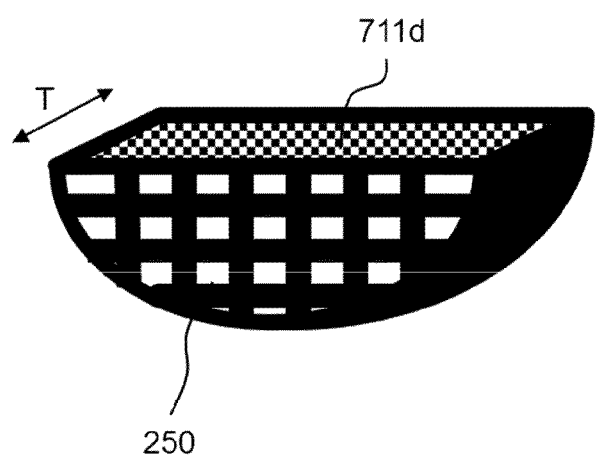
(d)

ULTRASONIC WELDING APPARATUS INCLUDING ROTATABLE ANVIL AND WELDING METHOD USING THE SAME

CROSS-REFERENCE TO RELATED APPLICATIONS

The present application is a national phase entry under 35 U.S.C. § 371 of International Application No. PCT/KR2021/014297, filed on Oct. 15, 2021, which claims priority from Korean Patent Application No. 10-2020-0137617 filed on Oct. 22, 2020, the disclosure of which is incorporated herein by reference in its entirety.

TECHNICAL FIELD

The present invention relates to an ultrasonic welding apparatus including a rotatable anvil. More particularly, the present invention relates to an ultrasonic welding apparatus including an anvil rotatable to achieve parallelism between a welding surface of a horn for ultrasonic welding and an upper surface of the anvil in order to prevent deviation in parallelism therebetween and a welding method using the same.

BACKGROUND ART

Demand for a secondary battery as an energy source for mobile devices, electric vehicles, etc. has abruptly increased. In particular, demand for a lithium secondary battery, which has high energy density and high discharge voltage, is high.

Based on the material for a case thereof, the lithium secondary battery may be classified as a cylindrical secondary battery made of a metal material, a prismatic secondary battery made of a metal material, or a pouch-shaped secondary battery made of a laminate sheet. The pouch-shaped secondary battery has advantages in that the pouch-shaped secondary battery is stacked with high integrity, thereby having high energy density per unit weight, is manufactured at low cost, and is easily deformable. Consequently, the pouch-shaped secondary battery is used in various devices.

The pouch-shaped secondary battery is manufactured by receiving an electrode assembly and an electrolytic solution in a case and thermally fusing the outer periphery of the case to hermetically seal the case, and an electrode lead of the electrode assembly is exposed outwards from the outer periphery of the case so as to function as an electrode terminal.

The electrode lead may be coupled to an electrode tab bundle, which is constituted by a plurality of electrode tabs coupled to each other, by welding. When resistance welding or laser welding is used, excessive energy is applied to the electrode assembly, whereby the performance of the lithium secondary battery may be deteriorated. For this reason, environmentally-friendly ultrasonic welding, which is in the spotlight and which has seen increased applications, has been mainly used in recent years.

An ultrasonic welding apparatus may include an ultrasonic oscillator, an ultrasonic vibrator, a booster, a horn, and an anvil. The ultrasonic oscillator converts AC current of 60 Hz into high-frequency current of 20 kHz or more and supplies the high-frequency current to the ultrasonic vibrator. The ultrasonic vibrator converts the high-frequency current generated by the ultrasonic oscillator into ultrasonic waves. The converted ultrasonic waves are moved to the booster, and the booster amplifies the received ultrasonic waves and transmits the amplified ultrasonic waves to the horn.

The horn presses surfaces of electrode tabs and an electrode lead placed on the upper surface of the anvil with a predetermined load, and at the same time applies the amplified ultrasonic waves, received from the booster, thereto to weld the electrode tabs and the electrode lead to each other.

A condition for securing high welding quality when the ultrasonic welding apparatus is used is to achieve parallelism between the horn and the anvil. In general, the anvil is fixed to a main body, whereby there occurs no misalignment at the time of setting. However, the horn is connected to the cylindrical booster. As a result, the horn gets slightly out of place in a process of checking horizontal setting of the horn with the naked eye and fixing the horn using bolts.

In connection therewith, FIG. 1 shows a welding process using a conventional ultrasonic welding apparatus.

Referring to FIG. 1, in the case in which a horn 10 is slightly misaligned by X degrees, parallelism between the horn 10 and an anvil 20 is not achieved. Consequently, welding is performed in the state in which the surface of the horn 10 that contacts a target 30 to be welded is misaligned by X degrees relative to the target to be welded. As a result, welding is satisfactorily performed only at a portion (b), and thus a non-welded portion (a) and an over-welded portion (c) are formed.

If there occurs deviation in the parallelism between the horn and the anvil, as described above, the degree of tight contact between the horn and the anvil is changed, whereby tight-contact pressure to the target to be welded is changed, which causes a difference in temperature between welded portions. As a result, there occurs a difference in welding strength, as described above.

Also, in the case in which welding is performed in the state in which the horn is misaligned, protrusions formed on the horn are unevenly worn, whereby the lifespan of the horn is reduced. A short exchange cycle of the horn lowers a utilization rate of a production line.

In order to solve this problem, Korean Registered Patent Publication No. 2072853 ("the '853 publication") discloses a horn parallelism setting apparatus capable of correcting the angle of a horn such that the horn is parallel to an anvil using a setting block upon determining that there occurs deviation in parallelism between the horn and the anvil.

The horn parallelism setting apparatus of the '853 publication includes a horn parallelism setting block, a setting block measurement unit, and a horn angle correction unit, which are configured to perform horn parallelism setting. As a result, the structure of a welding apparatus is complicated, and it is necessary to secure space and cost necessary to provide such facilities.

Korean Registered Patent Publication No. 1773644 ("the '644 publication"), which relates to a horizontal adjustment jig configured to level a horn and an anvil constituting an ultrasonic welding apparatus, discloses a method of inserting the horn and the anvil into a jig frame and adjusting the level of the horn and the level of the anvil.

In the '644 publication, it is necessary to perform an operation of manually fastening bolts in order to level the horn and the anvil, and therefore accurate control may be difficult.

Therefore, there is a high necessity for technology capable of easily achieving parallelism between a horn and an anvil of an ultrasonic welding apparatus in order to secure ultrasonic welding quality.

DISCLOSURE

Technical Problem

The present invention has been made in view of the above problems, and it is an object of the present invention to provide an ultrasonic welding apparatus including a rotatable anvil capable of easily achieving parallelism between a horn and the anvil of the ultrasonic welding apparatus, whereby it is possible to secure excellent welding quality, and a welding method using the same.

Technical Solution

In order to accomplish the above object, an ultrasonic welding apparatus according to the present invention includes a horn unit including a horn configured to be vibrated in a state of being in contact with a target to be welded and a vibrator configured to apply vibration to the horn; an anvil unit including an anvil having an upper flat surface on which the target to be welded is placed and a support portion configured to support the anvil in a rotatable state; and a welding main body configured to allow the horn unit and the anvil unit to be fixed thereto, wherein the anvil is rotated in a state of being supported by the support portion such that the upper flat surface of the anvil is parallel to a welding surface of the horn.

The anvil may be formed in the shape of any one of a cylinder or an oval column having a section perpendicular to the lower surface thereof and a sphere having a section, the section may become the upper flat surface, the support portion may be formed in the shape of a container having formed therein an inner space configured to receive a curved surface of the cylinder, the oval column, or the sphere in a rotatable state, and the anvil may be disposed such that the upper flat surface protrudes outwards from the support portion in an initial state in which the anvil is stopped.

A lubricant or a bearing may be added to contact surfaces of the support portion and the anvil.

The support portion may be fixed to the welding main body.

A recess or a through-hole may be formed in at least a portion of the external surface of the anvil excluding the upper flat surface of the anvil.

The anvil may have a flat section formed by cutting the cylinder perpendicularly to the lower surface thereof such that less than 50% of the cylinder remains, the section may become the upper flat surface, the support portion may be formed in the shape of a container having formed therein an inner space configured to receive a curved surface of the cylinder in a rotatable state, and a central axis of the cut cylinder, about which the cut cylinder is rotated, may coincide with a central axis of the horn.

The anvil may have a three-dimensional structure in which a section provided at an upper part of the anvil becomes the upper flat surface, and a fixing shaft of the support portion may extend through the anvil so as to be fixed to the welding main body.

The fixing shaft may be parallel to the upper flat surface, or may be parallel to a portion of a rotating surface of the anvil.

A protrusion may be formed on at least one of surfaces of the horn and the anvil that abut each other.

In addition, the present invention provides a welding method using the ultrasonic welding apparatus.

Specifically, the welding method may include (S1) disposing a target to be welded on the upper flat surface of the anvil, (S2) disposing the welding surface of the horn on the upper surface of the target to be welded, (S3) rotating the anvil to align the anvil such that the upper flat surface is parallel to the welding surface of the horn, and (S4) applying ultrasonic waves to perform welding.

Ultrasonic waves may be applied to perform welding after rotation of the anvil is stopped.

In addition, the present invention may provide all possible combinations of the above solving means.

Advantageous Effects

As is apparent from the above description, in the case in which an ultrasonic welding apparatus according to the present invention is used, an anvil is rotatable based on the angle of a welding surface of a horn, whereby it is possible to easily achieve parallelism between the horn and the anvil simply through tight contact between the horn and the anvil.

In addition, frictional force generated on a rotating surface of the anvil is minimized, whereby it is possible to rapidly and accurately achieve parallelism between the horn and the anvil.

In addition, the anvil is fixed to a welding main body via a support portion, even though the anvil is rotatable, whereby it is possible to prevent movement of the anvil in a vibration direction of the horn.

In addition, an upper flat surface of the anvil protrudes farther than an upper end of the support portion. Consequently, the upper flat surface of the anvil remains protruding farther than the support portion even in the state in which the anvil mounted to the support portion is rotated, whereby it is possible to secure an area necessary for welding.

Since ultrasonic welding is performed in the state in which parallelism between the horn and the anvil is easily achieved, as described above, it is possible to prevent protrusions formed on the horn from being unevenly worn and to lengthen the lifespan of the horn, whereby it is possible to prevent lowering of a utilization rate of a production line.

DESCRIPTION OF DRAWINGS

FIG. 1 is a view showing a welding process using a conventional ultrasonic welding apparatus.

FIG. 2 is a perspective view of an ultrasonic welding apparatus according to the present invention.

FIG. 3 is an exploded perspective view of an anvil unit according to a first embodiment.

FIG. 4 is a vertical sectional view of the anvil unit of FIG. 3.

FIG. 5 is a perspective view of an anvil unit according to a second embodiment.

FIG. 6 is a front view of an anvil according to a third embodiment.

FIG. 7 is a perspective view of an ultrasonic welding apparatus according to a fourth embodiment.

FIG. 8 is a front view of an anvil according to a fifth embodiment.

FIG. 9 is a perspective view showing various shapes of the anvil.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 2 is a perspective view of an ultrasonic welding apparatus according to the present invention.

Referring to FIG. 2, the ultrasonic welding apparatus according to the present invention includes a horn unit 100 including a horn 110 configured to be vibrated in a state of being in contact with a target to be welded and a vibrator 120 configured to apply vibration to the horn 110; an anvil unit 200 including an anvil 210 having an upper flat surface on which the target to be welded is placed and a support portion 220 configured to support the anvil in a rotatable state; and a welding main body 300 configured to allow the horn unit 100 and the anvil unit 200 to be fixed thereto, wherein the anvil 210 is rotated in a state of being supported by the support portion 220 such that the upper flat surface of the anvil is parallel to a welding surface 111 of the horn 110.

In general, before ultrasonic waves are applied after the horn 110 is mounted to a horn holder 130, a process of aligning the horn 110 is required such that the welding surface 111 of the horn 110 and the upper flat surface of the anvil 210 are parallel to each other.

Conventionally, in the process of aligning the horn 110, the direction of the horn is visually checked and fixed, a welded state of a weld result is determined, and the horn 110 is realigned. Slight deviation in parallelism between the welding surface 111 of the horn 110 and the upper flat surface of the anvil 210 may occur, and therefore, there is a problem in that pre-adjustment of the slight deviation in parallelism is difficult.

In the present invention, however, the rotatable anvil 210 is used. Even though the welding surface 111 of the horn is disposed so as not to be parallel to the upper surface of the target to be welded, therefore, the anvil 210 on which the target to be welded is placed is rotatable so as to be parallel to the welding surface 111 of the horn 110.

Since the horn 110 is vibrated in an x-axis direction by ultrasonic vibration, the anvil 210 must be fixed in place in the support portion 220.

In addition, the support portion 220 is fixed to the welding main body 300, whereby movement of the anvil 210 in the x-axis direction is prevented.

FIG. 3 is an exploded perspective view of an anvil unit according to a first embodiment.

Referring to FIG. 3, the anvil 210 is configured to have a section formed by cutting a cylinder perpendicularly to a circular lower surface thereof, wherein the section becomes an upper flat surface 211 of the anvil 210. The support portion 220 is configured to have a structure provided with an inner space 222 configured to receive the anvil 210 in a rotatable state. The support portion 220 of FIG. 3 is configured to have a structure in which two separable members are coupled to each other.

A protrusion is formed on the upper flat surface 211 of the anvil 210. When the horn rubs against the upper surface of the target to be welded while being vibrated and the anvil rubs against the lower surface of the target to be welded, weldability may be further improved by the protrusion.

The protrusion may be formed on the welding surface of the horn. The size of the protrusion formed on the welding surface of the horn and the size of the protrusion formed on the upper flat surface of the anvil may be equal to each other, or may be different from each other.

FIG. 4 is a vertical sectional view of the anvil unit of FIG. 3.

Referring to FIG. 4, although FIG. 4 shows the state in which a space is formed between the anvil 210 and the support portion 220 for convenience of understanding, it may be understood that there is actually little space between the anvil 210 and the support portion 220 such that the anvil cannot move in the support portion. In addition, a lubricant or a bearing may be added to the entire contact surfaces of the support portion 220 and the anvil 210, and therefore there may be almost no friction therebetween when the anvil is rotated in directions indicated by arrows.

The anvil 210 of FIG. 4 has a semicircular side surface, wherein the lengths of line (a), line (b), and line (c) are equal to each other. Alternatively, the lengths of line (a) and line (c) may be less than or greater than the length of line (b) within a range within which the lengths of line (a) and line (c) are equal to each other such that the side surface of the anvil is oval.

In an initial state in which the anvil is stopped while being parallel to the welding surface of the horn, however, the upper end 230 of the support portion must not protrude further than the upper flat surface 211 of the anvil, irrespective of the shape of the side surface of the anvil.

Even though the anvil mounted in the inner space 222 of the support portion 220 is rotated in directions indicated by arrows, therefore, it is preferable for the upper flat surface 211 of the anvil to protrude further than the upper end 230 of the support portion.

FIG. 5 is a perspective view of an anvil unit according to a second embodiment.

Referring to FIG. 5, the anvil unit includes an anvil 310 having a shape obtained as the result of a sphere being cut and a support portion 320 having formed therein an inner space having a size corresponding to the external surface of the sphere.

An upper flat surface 311 of the anvil 310 is formed so as to protrude further than the upper end of the support portion 320.

The anvil 310 and the support portion 320 have corresponding sizes without a space therebetween, and a lubricant is added between the anvil 310 and the support portion 320, whereby the anvil 310 is rotatable in the support portion 320. It is preferable for the upper flat surface 311 of the anvil to have a size protruding farther than the upper end 330 of the support portion even though the anvil is rotated.

FIG. 6 is a front view of an anvil according to a third embodiment.

Referring to FIG. 6, the anvil 410 is configured to have a flat section formed by cutting a cylinder perpendicularly to the lower surface thereof such that less than 50% of the cylinder remains, wherein the section becomes an upper flat surface of the anvil. A central axis 401 of the anvil 410, which has a cut cylindrical shape, about which the anvil is rotated, coincides with a central axis of the horn 110.

In this structure, the rotation angle of the anvil 410 may be maintained within an overall range of 0 to 360 degrees such that parallelism between the anvil and the welding surface of the horn is achieved.

FIG. 7 is a perspective view of an ultrasonic welding apparatus according to a fourth embodiment.

Referring to FIG. 7, an anvil 510 has a three-dimensional structure in which a section provided at the upper part of the anvil becomes an upper flat surface 511 of the anvil, and a support portion 520 is configured to have a structure in which a fixing shaft of the support portion extends through the anvil 510 in order to fix the anvil 510 to the welding main body 300.

Since the anvil 510 is securely fixed to the welding main body 300 by the fixing shaft of the support portion 520, the fixed state of the anvil may be maintained even when the horn 110 is vibrated.

FIG. 8 is a front view of an anvil according to a fifth embodiment.

Referring to FIG. 8, the anvil 610 is configured to have a semicircular column formed by cutting a cylinder perpendicularly to a circular side surface thereof, and a support portion 620 of the anvil 610 is configured to have a structure in which a fixing shaft extends through the anvil 610 in a thickness direction (T of FIG. 9) to fix the anvil 610 to the welding main body, wherein the fixing shaft is parallel to a portion of a curved surface of the semicircular column, i.e. a rotating surface 618, of the anvil 610.

(b) of FIG. 8 shows the state in which the anvil 610 shown in (a) of FIG. 8 is rotated about the support portion 620 as the fixing shaft in a counterclockwise direction, and (c) of FIG. 8 shows the state in which the anvil 610 is rotated about the support portion 620 as the fixing shaft in a clockwise direction.

FIG. 9 is a perspective view showing various shapes of the anvil.

Referring to FIG. 9, (a) to (d) of FIG. 9 show three-dimensional shapes having sections, wherein the sections become upper flat surfaces 711a, 711b, 711c, and 711d, on each of which a target to be welded is disposed.

Specifically, (a) of FIG. 9 shows a quadrangular pyramid shape, (b) of FIG. 9 shows a shape formed by cutting an oval column along a line parallel to the major diameter of one oval surface thereof, and (c) of FIG. 9 shows a shape formed by cutting an oval column along a line parallel to the minor diameter of one oval surface thereof. The external shape of (d) of FIG. 9 is identical to the external shape of (b) of FIG. 9 except that through-holes 250 are formed through the anvil in a thickness direction T. In another embodiment of (d) of FIG. 9, the interior of the anvil is filled, as shown in (a) to (c) of FIG. 9 and recesses are formed on the outer surface of the anvil, which is included in the category of the present invention.

The anvil shown in (a) of FIG. 9 is applicable to the case in which the support portion is configured to have a structure in which the fixing shaft of the support portion is parallel to the upper flat surface of the anvil, and each of the anvils shown in (b) to (d) of FIG. 9 is applicable to the case in which the support portion is configured to have a structure in which the fixing shaft of the support portion is parallel to the upper flat surface of the anvil, the case in which the support portion is parallel to a portion of the rotating surface of the anvil, or the case in which the support portion has an inner space formed therein.

A welding method according to the present invention includes (S1) a step of disposing a target to be welded on an upper flat surface of an anvil, (S2) a step of disposing a welding surface of a horn on the upper surface of the target to be welded, (S3) a step of rotating the anvil to align the anvil such that the upper flat surface of the anvil is parallel to the welding surface of the horn, and (S4) a step of applying ultrasonic waves to perform welding.

Specifically, the target to be welded is disposed on the upper flat surface of the anvil, the welding surface of the horn is disposed on the target to be welded, and the horn is pushed in a direction toward the upper flat surface of the anvil. As a result, the anvil is rotated such that the entirety of the upper flat surface of the anvil and the entirety of the welding surface of the horn come into tight contact with each other. When parallelism between the upper flat surface of the anvil and the welding surface of the horn is achieved based on the target to be welded as the result of the rotation of the anvil, the rotation of the anvil is stopped. In this state, ultrasonic waves are applied to perform welding.

Those skilled in the art to which the present invention pertains will appreciate that various applications and modifications are possible within the category of the present invention based on the above description.

DESCRIPTION OF REFERENCE SYMBOLS

100: Horn unit
10, 110: Horns
111: Welding surface
120: Vibrator
130: Horn holder
30: Target to be welded
20, 200: Anvil units
210, 310, 410, 510, 610: Anvils
211, 311, 511, 711a, 711b, 711c, 711d: Upper flat surfaces
220, 320, 520, 620: Support portions
222: Inner space
230, 330: Upper end of support portion
250: Through-hole
300: Welding main body
401: Central axis
618: Rotating surface
T: Thickness direction

INDUSTRIAL APPLICABILITY

The present invention relates to an ultrasonic welding apparatus including an anvil rotatable to achieve parallelism between a welding surface of a horn for ultrasonic welding and an upper surface of the anvil in order to prevent deviation in parallelism therebetween and a welding method using the same, and therefore the present invention has industrial applicability.

The invention claimed is:

1. An ultrasonic welding apparatus comprising:
   a horn unit including a horn
      wherein the horn is configured to contact a target to be welded, the horn including at least one protrusion extending from a surface of the horn configured to contact the target to be welded,
      and a vibrator configured to apply vibration to the horn;
   an anvil unit including:
      an anvil having a first flat surface on which the target to be welded is configured to be placed, and
      a support portion configured to support the anvil in a rotatable state; and
   a welding main body configured to have the horn unit and the anvil unit fixed thereto, wherein
   the anvil is not fixed to the support portion,
   the anvil is rotated in a state of being supported by the support portion such that the first flat surface of the anvil is parallel to a welding surface of the horn,
   the anvil has a three-dimensional structure in which a section provided at a first part of the anvil becomes the first flat surface, and
   a fixing shaft of the support portion extends through the anvil so as to be fixed to the welding main body, wherein a first end of the fixing shaft is coupled to the anvil and a second end of the fixing shaft opposite the first end is coupled to the welding main body.

2. The ultrasonic welding apparatus according to claim 1, wherein
   the anvil is formed in a shape of any one of (1) a semi-cylinder cut along a longitudinal direction of a cylinder, (2) an ovular semi-cylinder cut along a longitudinal direction of an ovular cylinder, and (3) a hemisphere.

3. The ultrasonic welding apparatus according to claim 1, wherein the support portion is fixed to the welding main body.

4. The ultrasonic welding apparatus according to claim 1, wherein a recess or a through-hole is formed in at least a portion of an external surface of the anvil excluding the first flat surface of the anvil.

5. The ultrasonic welding apparatus according to claim 1, wherein
   the anvil is formed in the shape of the semi-cylinder, and the anvil has a flat section formed by cutting the cylinder perpendicularly to the surface of the anvil such that less than 50% of the cylinder remains,
   the section becomes the first flat surface,
   and
   a central axis of the cut cylinder, about which the cut cylinder is rotated, coincides with a central axis of the horn.

6. The ultrasonic welding apparatus according to claim 1, wherein the fixing shaft is parallel to the first flat surface, or is parallel to a portion of a rotating surface of the anvil.

7. The ultrasonic welding apparatus according to claim 1, wherein the at least one protrusion is a first protrusion and a second protrusion is formed on a surface of the anvil that abuts a surface of the horn.

8. A welding method using the ultrasonic welding apparatus according to claim 1, the welding method comprising:
   (S1) disposing the target to be welded on the first flat surface of the anvil;
   (S2) disposing the welding surface of the horn on a surface of the target to be welded;
   (S3) rotating the anvil to align the anvil such that the first flat surface is parallel to the welding surface of the horn; and
   (S4) applying ultrasonic waves to perform welding.

9. The welding method according to claim 8, wherein ultrasonic waves are applied to perform welding after rotation of the anvil is stopped.

10. The ultrasonic welding apparatus according to claim 1, wherein the anvil includes a rounded surface and wherein an outer periphery of the first flat surface coincides with an upper end of the rounded surface.

* * * * *